O₂ – 3.75 %

O₂ – 3.0 %

Welding Electrode    Gas Nozzle

O₂ – 2.7 %

O₂ – 1.9 %

O₂ – 1.5 %

O₂ – 0.9 %

Oct. 5, 1965    H. C. LUDWIG    3,210,516
AUTOMATIC INERT GAS ARC WELDING PROCESS
Original Filed May 6, 1952    4 Sheets-Sheet 2

INVENTOR
Howard C. Ludwig.
BY
ATTORNEY

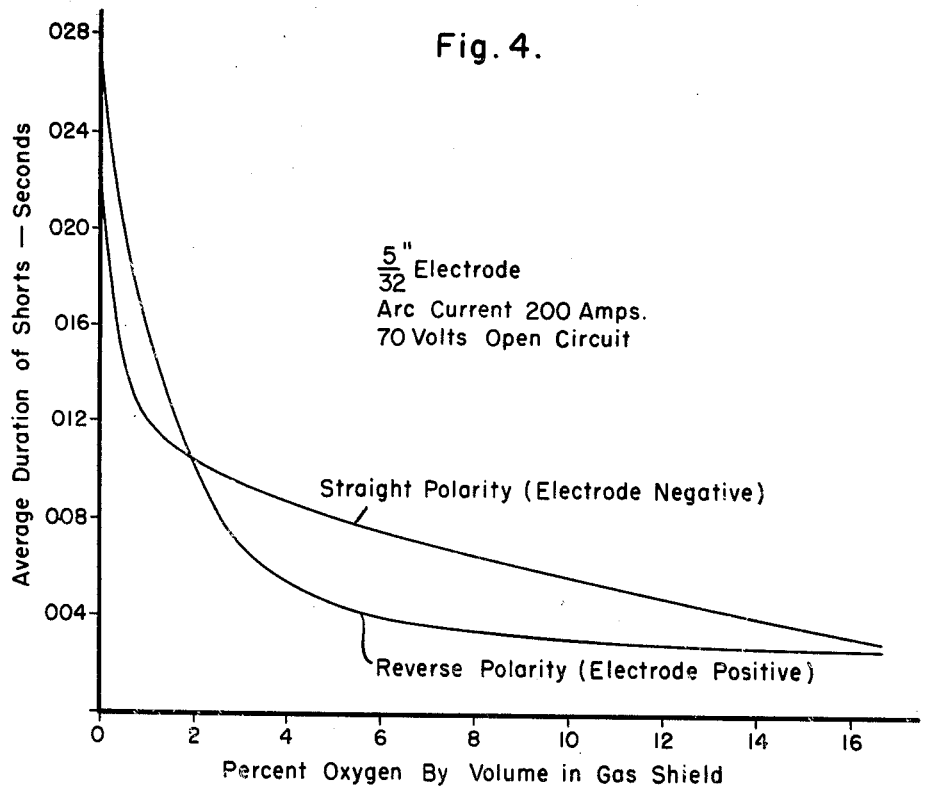
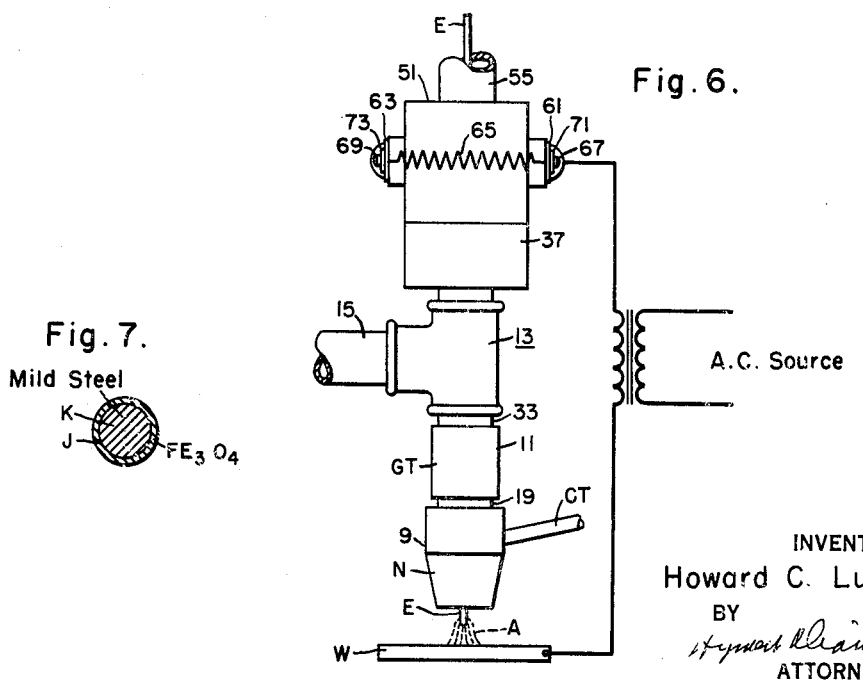

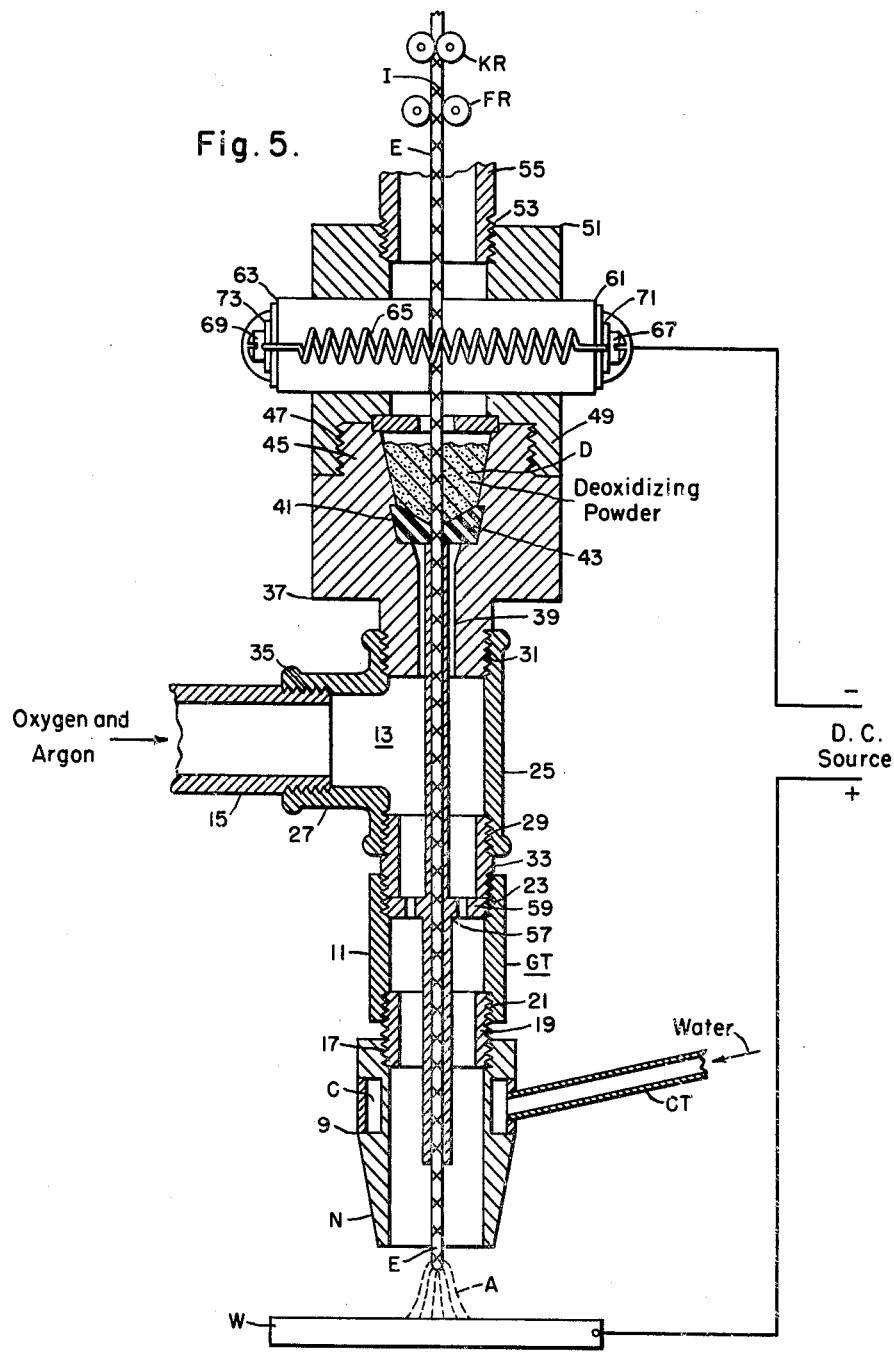

United States Patent Office 3,210,516
Patented Oct. 5, 1965

3,210,516
AUTOMATIC INERT GAS ARC WELDING PROCESS
Howard C. Ludwig, Pittsburgh, Pa., assignor to Westinghouse Electric Corporation, Pittsburgh, Pa., a corporation of Pennsylvania
Continuation of abandoned application Ser. No. 571,537, Mar. 14, 1956, which is a division of application Ser. No. 286,348, May 6, 1952. This application Mar. 3, 1965, Ser. No. 444,886
9 Claims. (Cl. 219—74)

This application is a continuation of application Serial No. 571,537, filed March 14, 1956, which is itself a division of application Serial No. 286,348, filed May 6, 1952, both now abandoned. The above applications are assigned to Westinghouse Electric Corporation.

The invention disclosed in this application relates to arc welding and has particular relationship to arc welding in an inert-gas shield with a consumable electrode or filler.

Arc welding of the type involved in this invention is applied to the welding of a wide range of metals and alloys, including steel of different types and of different alloy proportions extending over the range from low-carbon, low-alloy steel to stainless steel, aluminum, magnesium, nickel and cobalt and their alloys, and copper and its alloys including bronze and brass. This invention comprehends within its scope the welding of these metals and alloys but in its specific aspects, it involves particularly the welding of steel and specifically alloys called high-carbon steel, low-carbon steel, mild steel, killed steel and rimmed or semi-killed steel. Since steel will be so designated hereinafter, definitions of the various designations may be desirable.

High-carbon steel is steel having a carbon content exceeding 0.5%. Medium-carbon steel is steel having a carbon content of between 0.2% and 0.5%. Steel having a carbon content of less than 0.2% is called low-carbon steel. Mild steel is a loose term defining steel having a carbon content of the order of 0.1%. In the process of manufacturing steel, silicon is added as deoxidizing agent to stop the oxidation of the carbon. When silicon is added in sufficient quantity to stop the carbon-oxygen reaction entirely, the steel is called killed steel. When silicon is added in insufficient quantity to stop the oxidation, the steel is referred to as semi-killed. Thus, steel in which the silicon is less than about 0.1% is semi-killed. Steel which has no appreciable deoxidizing content is called rimmed steel.

In the welding of the above-mentioned materials, the consumable electrode may have, but need not have, substantially the same composition as the material or work to be welded. Thus, high-carbon steel may be welded with a low-carbon steel electrode. A potential is impressed between the electrode and the work, and an arc is struck between these two metals. The electrode is melted and deposited on the work, and as it melts, it is gradually fed towards the work while the arc is maintained. The arc is shielded from the atmosphere by a stream of inert gas, such as helium or argon, in general preferably argon.

In accordance with the teachings of the prior art, the potential impressed between the electrode and the work is a direct current potential, and the work is preferably maintained electrically negative relative to the electrode. This potential relationship of the electrode and the work is referred to in the art as reverse polarity. In situations in which the electrode is maintained electrically negative relative to the work, the operation is said to be at straight polarity. In accordance with the teachings of the prior art, the shielding stream is substantially pure inert gas.

In the work out of which this invention developed, experiments were conducted in accordance with the teachings of the prior art in which a shielding stream of argon gas of 99.8% purity with the predominant impurity nitrogen was used.

Arc welding of the type just described has several disadvantages. In the welding of low-carbon steels (at reverse polarity), particularly those having a content of 0.5% or less of such elements as manganese, silicon and chromium, the weld beads are of poor quality, and the welds are severely undercut, that is the material to be welded is melted beyond the region in which the electrode is deposited. Thus, welds with the steels in the following table have been produced and have been found to be of poor quality.

TABLE I

*Chemical analyses*

| Material | C | Mn | Si | S | P | Total Al |
|---|---|---|---|---|---|---|
|  | Percent | Percent | Percent | Percent | Percent | Percent |
| Welding wire | 0.10 | 0.41 | 0.004 | 0.02 | 0.22 | 0.008 |
| Plate stock, 1/16" thick | 0.05 | 0.26 | 0.006 | 0.03 | 0.016 | 0.008 |
| Plate stock, 1/8" thick | 0.03 | 0.28 | 0.005 | 0.04 | 0.007 | 0.007 |
| Plate stock, 1/4" thick | 0.06 | 0.35 | 0.005 | 0.04 | 0.002 | 0.008 |

Poor welds of the type just described also manifest themselves in the welding of other metals, particularly in situations in which T joints and the like are welded.

The welding at reverse polarity (work negative) also is at times a disadvantage. For example, it has been found that the consumption of the welding electrode at straight polarity is approximately 1.8 times the consumption of the same electrode at reverse polarity. Thus, the use of straight polarity in welding would effect an increase in the speed at which the work is produced. But, in attempting to weld at straight polarity in a shield of substantially pure inert gas, it has been found that the arc is highly unstable and wanders over so large an area of the welding electrode that a satisfactory welding operation cannot be carried out. It has also been found that a large number of short circuits occur, and whatever weld is produced is relatively poor.

Further, in certain situations, it would be highly desirable to dispense with the direct current source entirely. Attempts to weld with alternating current in accordance with the teachings of the prior art have proved entirely unsatisfactory.

It is accordingly an object of this invention to improve materially the welds produced in gas-shielding consumable-electrode arc welding and particularly in the arc welding of steel.

Another object of this invention is to provide a method of gas-shielding consumable-electrode arc welding in the practice of which sound welds having adequate mechanical strength shall be produced.

A specific object of this invention is to provide a method of gas-shielding consumable-electrode arc welding at straight polarity in the practice of which sound welds having adequate mechanical strength shall be produced.

A further specific object of this invention is to provide a method of welding certain materials with an alternating current arc in the practice of which sound welds having adequate mechanical strength shall be produced.

This invention arises in part from the discovery that the deficiencies in the welds produced in accordance with the teachings of the prior art are caused by variation in pressure or turbulence in the region of the weld. This turbulence is imparted to the gas shield, and it is penetrated by air. Oxygen and nitrogen are thus absorbed in the melted mass during the welding process and produce blow-holes in the weld.

It has been found that the nitrogen is principally involved in this deterioration of the weld. It is present in the air in far larger quantities than the oxygen (about 80% $N_2$ as compared to about 20% $O_2$) and when the arc is turbulent a far larger proportion of the nitrogen than of the oxygen impinges on the melted metal. Nitrogen has a higher solubility in materials such as steel in liquid condition than when such materials have solidified. The nitrogen which by reason of the turbulence impinges on the liquid metal during the welding process is dissolved in the metal and as the metal cools it is evolved. The metal solidifies as the nitrogen gas is passing through it and blowholes are thus formed. In addition, the nitrogen forms solid nitrides with the materials, particularly if it is steel, which deleteriously affects the welding joint. It has been found that as low as 1% nitrogen in the shield gas results in very porous welding joints.

The oxygen does not present so serious a problem with respect to solubility. In the absence of carbon in the material welded the oxygen is converted into solid oxides. These oxides in part remain in the melt and in part are separated out in the form of a slag which floats to the surface of the melt. In either event the presence of the oxides is not too serious. Where carbon is present in sufficient quantity carbon dioxide is formed and the compound has solubility properties similar to those of nitrogen and likewise causes blowholes but is not present in as large quantities as the nitrogen.

The realization that the nitrogen and not the oxygen is the principal factor in the determination of the weld was an important step in this invention. Realizing this fact, it has been concluded that improvement in the welding could be effected by suppressing the turbulence and thus preventing the nitrogen from breaking through the gas shield and impinging on the weld while in process.

To suppress the turbulence it was necessary to know what causes it. It has been found that the turbulence has three principal interrelated causes: the wandering of the arc over the surface of the electrode or the work; abrupt variations in arc voltage; and short circuits produced primarily by globules of the melted metal.

The wandering of the arc may be seen in a prior art welding operation. When welding at reverse polarity, the arc wanders over an area of the work, which area is roughly proportional to the square root of the welding current. Because the arc wanders, it introduces variations in heating over the surface of the work, and turbulence of the shielding gas in the region of the weld results. As has been pointed out, in attempting to weld at straight polarity in accordance with the teachings of the prior art, the arc wanders over a substantially wider area about the welding electrode than it wanders about the work at reverse polarity and is so unstable as to prohibit the use of straight polarity altogether. At straight polarity the gas in the region of the arc is more turbulent than at reverse polarity because of the violent wandering about the electrode.

An incidental effect of the wandering of the arc at reverse polarity is the undercutting which has been observed in welding in accordance with the prior art. Since the arc wanders beyond the area to which the electrode is deposited, it has a tendency to melt the work beyond this area and to produce the undercut.

It has been observed that abrupt changes occur in the arc voltage as the arc current changes. Thus, in the welding of mild steel at reverse polarity, with a substantially pure argon shield, it has been found that the arc changes from low level voltage to a high level voltage at a current of the order of 270 amperes. This abrupt change in voltage was observed with electrode wires having diameters in the range from 0.045 inch to 0.156 inch at reverse polarity. The transition in the arc voltage necessarily results in a sharp transition in the heat produced at the arc and therefore in sharp changes in the pressure of the gas in the region of the arc. Severe turbulence is thus produced both by reason of the change in the energy consumed at the arc and at the accompanying wandering. These voltage variations are accompanied by wandering of the arc and are thus at least in part responsible for the arc wandering described above.

The variations in the arc voltage are far more marked in attempting to weld at straight polarity in accordance with the teachings of the prior art than in welding with reverse polarity. However, the effect is present in welding at reverse polarity and its influence is accentuated by the fact that in welding at reverse polarity the current is maintained high to provide a spray transfer rather than a globular transfer.

It has been found that short circuits produce a sudden decrease of the power input to the region of the weld, and at the same time a sudden decrease in the temperature at the weld. This decrease in temperature produces a decrease in pressure of the shielding gas and air from outside of the inert gas shield is sucked into the region of the weld.

These observations have led to the conclusion that the operation of the arc at either polarity produces turbulence in the shielding gas surrounding the weld and that air consisting primarily of oxygen and nitrogen are absorbed in the hot welded mass because of this turbulence. This invention in its broader aspects arises from the realization that by stabilizing the arc the nitrogen may be substantially eliminated and the oxygen absorbed can be, to a large extent, rendered innocuous by introducing into the welded material a highly deoxidizing substance, such as aluminum. Thus, it has been found that welds produced with the materials listed in the above table in a shield of substantially pure inert gas, may be improved materially by coating the work with fine aluminum powder before it is welded. This powder in dry form may be applied to the work with an ordinary brush. Welds which have been produced with the materials listed in the table having a fine layer of aluminum powder on the work in a substantially pure inert gas shield, at reverse polarity are sound. A cut through a weld of this type, however, manifests that the bead contour is highly reentrant; that is, the angle between the unwelded work and the adjacent deposited electrode material is predominantly acute. Since it is desirable that the electrode metal be deposited smoothly, the welds of this latter type are not entirely satisfactory.

Further improvement in the welds is achieved on the basis of another discovery which has been made. It has been found that a small quantity of oxygen introduced in the region of the weld stabilizes the welding arc. This oxygen may be introduced in the inert gas shield itself. In accordance with these experiments, oxygen content as low as 0.25% by volume, or even less, in the inert gas stabilizes the arc, reduces its wandering over the negative electrode, reduces the incidence of short circuits, and reduces the incidence of increased arc voltage.

The oxygen content in the shield should not exceed 10%. This upper limit is fixed by the conflicting considerations first, that as little oxygen as practicable is desired, and second, that the more oxygen in the shield the more stable the arc. It has been found by experiment considered with these conflicting requirements in mind that there is inappreciable improvement in stability of the arc for oxygen contents beyond about 10% (actually between 6% and 10%), both at straight and reverse polarity and with electrodes and work of different steels. Thus according to these experiments for example it has been found that with an oxygen content as low as 0.25% it is possible to weld mild steel work with a thoroughly cleaned surface with a mild steel electrode having 2% manganese at reverse polarity with a highly stable arc. According to these experiments if the work is oxidized, even less oxygen in the inert gas shield is required to stabilize the arc.

An arc shielded by an inert gas stream having up to 10% oxygen by volume operates smoothly without producing turbulence in the gas surrounding it. Air is not drawn into such an arc, and thus the nitrogen and the oxygen from the atmosphere are prevented from producing a porous weld.

It has been found that in welding at reverse polarity, as little as 0.5% of oxygen by volume in the gas shield eliminates the undercut. It has also been found that at straight polarity because of the presence of the oxygen, the wandering about the negative electrode, the incidence of short circuits and the incidence of high voltages are sufficiently reduced to permit welding in many situations. In this way, the addition of the oxygen leads to a substantial increase in the welding speed by making possible use of straight polarity welding. Of course, undercutting does not occur at straight polarity.

In accordance with further aspects of this invention, the oxygen may be added in other ways than in the gas shield. For example, the welding electrode may include a coating capable of emitting oxygen. It has been found that an electrode coated with ferroso-ferric oxide ($Fe_3O_4$) is highly effective for such a purpose, and in accordance with a specific aspect of this invention, a welding electrode of mild steel coated with ferroso-ferric oxide is provided. Satisfactory welding may be carried out in accordance with this invention with such an electrode in a shield of substantially pure argon.

A preferred ferroso-ferric-oxide coated electrode is produced in accordance with this invention with Mayari-R wire. Such a wire has the following composition:

| | Percent |
|---|---|
| Carbon | 0.10 |
| Manganese | 0.75 |
| Silicon | 0.30 |
| Phosphorus | 0.10 |
| Nickel | 0.50 |
| Chromium | 0.75 |
| Copper | 0.50 |
| Iron | Remainder | and is copper coated as supplied by the manufacturer. In accordance with this invention the copper coating is removed and the surface of the wire is roughened by sandblasting. The wire is then passed through a solution as follows per gallon of water:

| | Oz. |
|---|---|
| Sodium hydroxide | 80 |
| Potassium nitrate | 50 |
| Urea | 2 | at its boiling temperature (290° to 300° F.). The time of immersion of the wire in this solution is from 5 to 30 minutes.

The other elements in the same atomic group as oxygen are also effective in stabilizing the arc. Thus, experiments which have been conducted reveal that sulphur reduces the area marked out by the wandering of the cathode by 28%, selenium by 35%, and tellurium by 40%. In addition it has been found that carbon dioxide also produces stabilization. In accordance with the broad aspects of this invention, these materials may be used to stabilize the arc as well as oxygen. However, oxygen is to be preferred over these materials.

It may be well to mention here the reasons for the stabilization phenomenon observed. It is believed that the stabilization is effected by oxidation of the metal at the electrode or the work, whichever is the cathode, and the operation of a stable arc between the oxide and the anode. This theory is borne out by the fact that improved stabilizing for a given quantity of oxygen is achieved for electrodes of smaller diameter at straight polarity since such electrodes are more readily oxidized.

It has been further discovered that in welding with a stable arc produced by adding oxygen in one way or another to the inert gas, blowholes are produced. These blowholes result from the interaction of the oxygen with the carbon in the steel to produce carbon dioxide which only partially evolves as the steel solidifies. The reaction is appreciable even on low-carbon steel. In addition oxides are produced which are absorbed in the melt, and deleteriously affect the mechanical properties. The extent of the damage to the welds depends on the quantity of the oxygen, but since a relatively considerable quantity of oxygen is required to stabilize the arc, the damage may in certain situations be rather substantial.

It has been further found that welds of high quality may be produced by converting the oxygen into solid oxides which float in the form of slag on the melted metal during the welding process and may be readily removed. This object is accomplished by adding a strongly deoxidizing material to the weld in one form or another. Investigations reveal that one or more of the materials, manganese, aluminum, silicon, zirconium, vanadium, phosphorus and chromium, are satisfactory for this purpose. These materials may be deposited on the work by brushing. Aluminum powder is suitable for this purpose. It has also been found that with manganese metal in the form of 200/dust powder brushed on the steel work welds of high quality are produced.

The deoxidizer may also be impressed on the electrode. In accordance with one aspect of this invention, a bare electrode in passing from its reel to the arc is corrugated by a knurled roller and pulled through an aluminum powder. It has been found that welds produced with medium carbon or low-carbon steel with a coated electrode of this type are highly satisfactory.

The deoxidizing agent may also be included in the material being welded or in the welding electrode. Highly satisfactory welds with medium-carbon steel contains in excess of 0.5% manganese have been produced. These welds were produced with an alternating current impressed between the electrode and the work, and the gas shield having an oxygen content by volume of approximately 5% and a 0.035" diameter electrode of mild steel containing 1.7% manganese. Sound lap joint welds of low-carbon steel were produced with direct current straight polarity impressed between the electrode and the work in accordance with this invention. In this case the oxygen content was 3% by volume, manganese was present to an amount of 1.7% by weight, and a wire electrode having a diameter of $\frac{1}{16}$ inch was used. Killed steel can also be welded satisfactorily without adding a deoxidizing agent. In this case the silicon functions as such an agent.

Where sulphur, selenium or tellurium are used to stabilize the arc, these elements must be correspondingly converted into an innocuous solid form by the addition of materials such as manganese which form solids with them. The addition of such materials is within the scope of this invention.

While many experiments have been carried out to a large extent with steel of different compositions, and this invention is particularly advantageous for steel, it has also been found that the arc is stabilized when this invention is applied to the welding of other metals and particularly to metals of the iron group.

The novel features considered characteristic of this invention have been discussed generally above. The invention itself, however, both as to its organization and its method of operation, together with additional objects and advantages thereof, will best be understood from the following description of specific embodiments when read in connection with the accompanying drawings, in which:

FIG. 4 is a graph showing the effect of adding oxygen on the incidence of short circuits;

FIG. 5 is a diagrammatic view showing a welding head in accordance with this invention and which is used in the practice of this invention;

FIG. 6 is a diagrammatic view showing a modification of this invention; and

FIG. 7 is a cross-section of a welding electrode in accordance with this invention.

Figure 1:
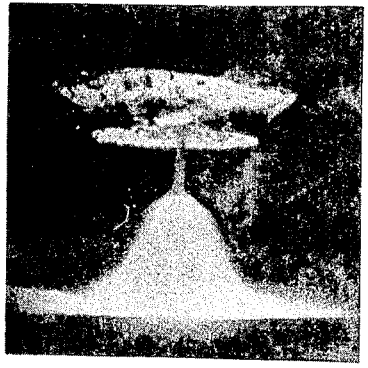
FIGURE 1 is a series of photographs showing the effect of adding oxygen to a gas shield on the shape and position of the arc plasma.
Figure 1:
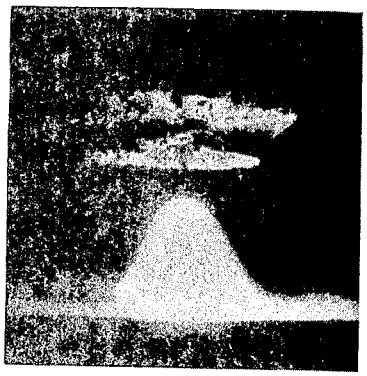
Figure 1:
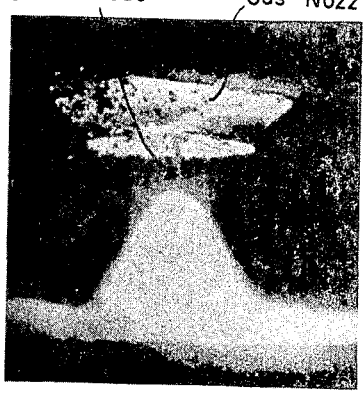
Figure 1:
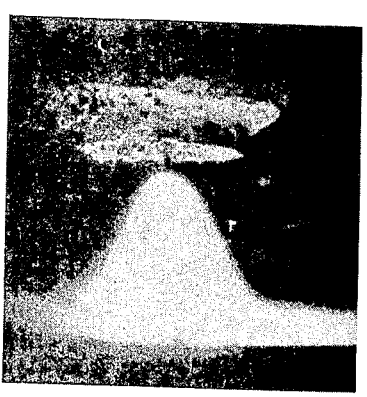
Figure 1:
Figure 1:

FIG. 1 shows a series of photographs of arcs burning in argon-oxygen shields having different contents by volume of oxygene. These arcs were produced between an electrode and work both of low-carbon steel, the electrode having a content of 2% manganese by weight with the electrode negative relative to the work, straight polarity. In each photograph, the outlet of the gas nozzle is shown projecting downwardly, and the electrode appears as a thin line projecting from the nozzle. The arc has the form of a probability curve.

It is seen that for oxygen contents of 3.75%, 3.0%, 2.7% and 1.9%, the arc extends below the nozzle but rises towards the nozzle as the oxygen content decreases. For contents of 1.5% and 0.9%, the arc appears diffuse and projects up into the nozzle. The four photographs in which the oxygen content is 1.9% or greater, reveal that for the corresponding oxygen contents the wandering of the arc along the electrode is relatively limited. It is seen from the remaining two photographs and particularly from the one with the oxygen content 0.9% that for the corresponding contents the arc wanders along the electrode to a substantial extent. The photographs thus demonstrate the manner in which oxygen in relatively small quantities in the shield stabilize the arc, and reduce its wandering and the resulting turbulence in the gas around the arc.

Attention is called to the increase in volume of the luminous gas as the oxygen content decreases. This increase in volume results in increasing turbulence in the gas.

Figure 2:
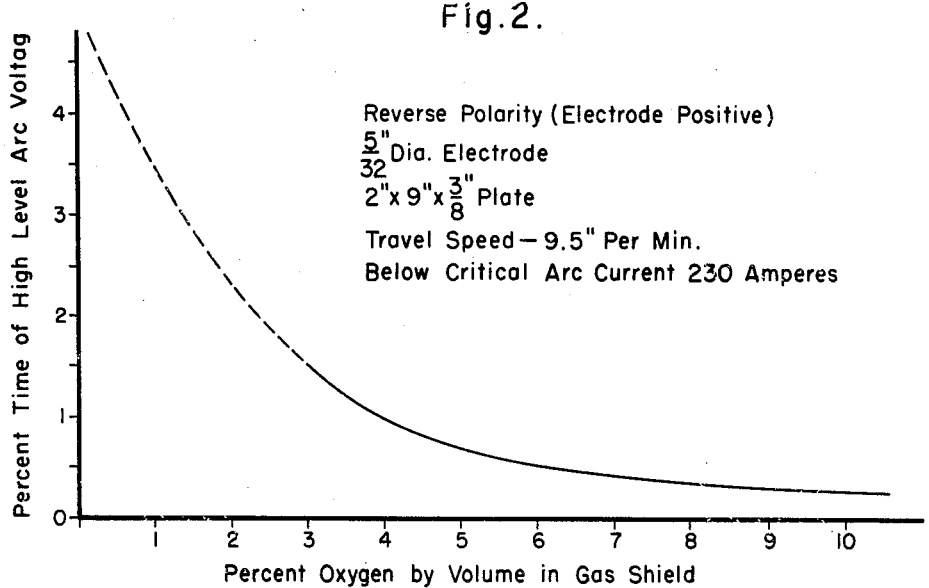
FIG. 2 is a graph showing the effect of adding oxygen to the gas shield on the arc-voltage variations.
Figure 3:
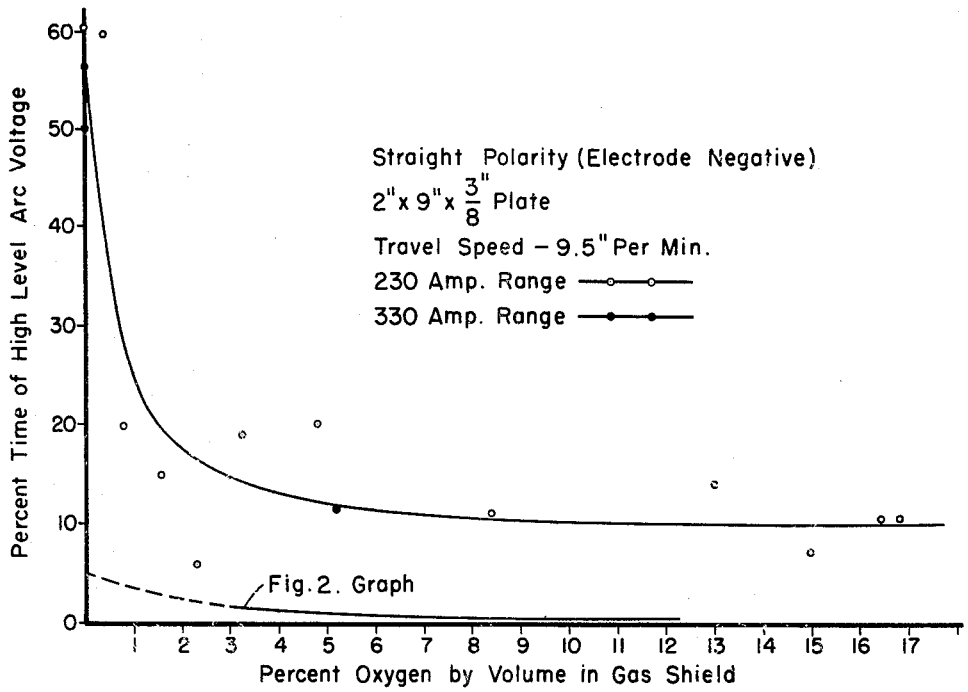
FIG. 3 is another graph showing the effect of the addition of oxygen to the gas shield on the arc-voltage variations.

FIGS. 2, 3 and 4 show quantitatively the effect of the oxygen in stabilizing the arc.

FIG. 2 is a graph showing the incidence of high level arc voltage as a function of oxygen content in the gas shield. This graph was derived by observing an arc between an electrode and work both of semi-killed low-carbon steel having a manganese content of approximately 0.5%. The arc was produced with the electrode positive relative to the work (reverse polarity). Incidence of high-level arc voltage (abrupt increases in voltage) is plotted vertically in percent, and the percent of oxygen by volume in the gas shield is plotted horizontally. It is seen that with an oxygen content of the order of 6%, the incidence of high level arc voltages is reduced to about 0.5%.

FIG. 3 shows a similar curve for the same materials operating at straight polarity; for comparison purposes, the graph shown in FIG. 2 is added. From FIG. 3, oxygen is seen to be highly effective in reducing the incidence of high level arc voltages. The incidence is reduced from 55% for substantially pure inert gas in the shield to 10% for an oxygen content of the order of from 8 to 10%.

The straight-polarity curve of FIG. 3 was prepared from data obtained with an arc between a 5/32" mild-steel electrode and work of mild steel with current as specified in FIG. 3. It has been found that with a 3/32" or smaller electrode under the same condition, the incidence of high arc voltage at straight polarity is cut down to a very low magnitude (less than 1%). This indicates that the oxidation theory described above is correct.

FIG. 4 shows the effect of oxygen in the gas shield on the average duration of short circuits. The duration is represented vertically in seconds, and the percent of oxygen by volume horizontally. Both curves of FIG. 4 were produced with a semi-killed low-carbon steel electrode and work of the same material. As labeled, one curve corresponds to operation at straight polarity, and the other at reverse polarity. The current was 200 amperes as indicated in FIG. 4. It is seen that the duration of short circuits both for straight polarity and reverse polarity operation is considerably reduced by the addition of the oxygen, and is relatively low for oxygen content of the order of 6% to 8% in both cases.

In FIG. 5, a welding head in accordance with this invention is shown. This head includes a tube GT made up of a number of sections 9, 11, 13 and 15 terminating in a nozzle N through which the shielding gas stream is projected over the arc A. The lower section 9 of the tube GT includes the nozzle N. It is generally in the form of a hollow cylinder terminating in a taper at the nozzle N. The portion C just above the nozzle N is hollow and communicates with a tube CT through which cooling water or other cooling liquid is supplied to the nozzle. The nozzle section has an internal thread 17 near its upper rim and is joined to the intermediate section 11 by a nipple 19 which engages the thread in the nozzle section and a corresponding internal thread 21 in the intermediate section 11. The intermediate section is of hollow cylindrical form having an internal thread 23 at its upper end, as well as at its lower end. The upper section 13 of the tube GT is a T joint. It includes a cylindrical portion 25 coaxial with the center section 11 and the nozzle section 9 which communicates with a cylindrical portion 27 at right angles to it. The coaxial cylindrical portion 25 has threads 29 and 31 at both ends and at its lower end is joined to the center section 11 by a nipple 33 which engages the lower thread 29 and the thread 23 in the central section. The cylindrical portion 27 at right angles to the axial portion has a thread 35 at its tip and engages the remaining section 15, a tube through which the oxygen and argon mixture flows.

The upper section of the tube GT is joined by its upper thread 31 to a block 37 of generally T cross section. Within this block, there is an axial narrow stem-like opening 39 which flares into a generally tapered opening 41. A rubber washer 43 extends into the base of this tapered opening and fits tightly in it. The block 37 is flanged at the top, and its projecting stem 45 has a thread 47 which engages the thread flange 49 of a cylinder 51. This cylinder has an internal thread 53 at the top and engages a tube 55.

The welding electrode or filler E extends through the tube through an opening in the washer 43, the stem opening 39 in the T-shaped block 37, and centrally through the gas tube GT. It is guided by a guide tube 57 having a flange 59 which is threaded and which engages the upper thread 23 of the central section 11 and is held in engagement therewith by the nipple 33 joining the central section to the upper section 13.

The electrode E is compressed between a pair of studs 61 and 63 projecting through openings in the upper tube 51. These studs are under the action of a spring 65 secured by bolts 67 and 69 and washers 71 and 73 in the extending edges of the studs 61 and 63. The spring 65 holds the studs in firm metallic engagement with the electrode E.

The electrode E is moved by feed rolls FR driven by a motor (not shown), and in passing from its reel (not shown) to the welding head, it is engaged by a knurled roller KR which produces identations I in its surface. As the electrode approaches the washer 43, it passes over dust D of a strongly deoxidizing material, such as manganese or aluminum, just above the washer. The washer 43 is composed of rubber and engages the electrode E tightly so that the deoxidizing material is compressed into the indentations I produced by the knurled roller KR.

The work W is disposed below the nozzle. Direct-current potential is impressed between the electrode and the work. This potential may be derived from a system such as is shown in Patent 2,734,981 granted February 14, 1956, to H. J. Bichsel and M. Rebuffoni, and assigned to Westinghouse Electric Corporation. The electrode E is connected to this source through one of the studs 61. The work W is directly connected to the source. As shown, the electrode E is negative relative to the work W; the operation then is at straight polarity. The electrode may also be positive relative to the work.

In operation, the gas is transmitted through the tube GT, and the work W and the electrode E are momentarily engaged and then separated a short distance to produce the arc A. This engagement and separation may be effected by hand or automatically with an automatic machine, for example, such as is disclosed in a Patent 2,752,469, granted June 26, 1956, to Robert W. Price, and assigned to Westinghouse Electric Corporation.

Once the arc A is produced, the welding by melting of the electrode and the projection of a melted spray towards the work proceeds. During the welding operation, the electrode is maintained by hand or automatically at a predetermined distance from the work, and the current is maintained at a predetermined magnitude. The distance from the work is such that the incidence of short circuits is at a minimum. The welding current should be sufficient to provide a spray rather than large drops of metal. The magnitude of the current to achieve this purpose varies with the diameter of the electrode, the character of the material and the composition of the shielding gas. It has been found that a satisfactory spray transfer of metal is produced in the welding of mild steel with an electrode having a diameter of $3/32$ inch applied with current of 200 amperes in argon-oxygen atmosphere containing 6% oxygen by volume. Under these circumstances, the electrode is fed at the rate of 80 inches per minute, and the operation is at reverse polarity. This operation may be compared with the operation in the absence of oxygen which would require 400 amperes of arc current to achieve the spray transfer.

While the apparatus shown in FIG. 5 is operated at straight polarity, it may also be operated at reverse polarity.

With the apparatus shown in FIG. 5, sound welds have been produced under the conditions tabulated below:

| Work | Electrode | | $O_2$ in shield by V, percent | Polarity | Deoxidizers | Current, amperes | Gas flow, cu. ft. hr. |
|---|---|---|---|---|---|---|---|
| | Size | Composition | | | | | |
| Mild Steel | 1/16" | Mayari-R | 3 | Straight | None added | 380 | 45 |
| Do | 1/16" | 2% Mn mild steel | 3 | do | do | 380 | 45 |
| Do | 1/16" | Rimmed steel | 3 | do | Mn brushed on work | 380 | 45 |
| Do | 0.035" | 2% Mn mild steel | 1/2 | Reverse | None Added | 200 | 45 |
| Do | 1/16" | Rimmed steel | 1/2 | do | Mn brushed on work | 280 | 35 |
| Medium carbon | 0.035" | 2% Mn mild steel | 4 3/4 | A.C. | None Added | 240 R.M.S. | 45 |

The apparatus shown in FIG. 6 is similar to that shown in FIG. 5, but in this case, alternating current is supplied to the arc instead of direct current. It has been found that sound welds may be produced from an alternating current supply with medium carbon steel having a manganese content exceeding 0.5% (½%) and with the oxygen shield having an oxygen content of the order of 5% with this apparatus.

In FIG. 7, an electrode in accordance with a specific aspect of this invention is shown. This electrode includes a core K of mild steel having a coating J of ferroso-ferric oxide.

The invention disclosed herein comprehends within its scope principally a method of arc welding which in its specific aspects involved the supply of oxygen to the weld to maintain a stable arc, and the provision in the region of the weld of a deoxidizing agent to convert the oxygen into a less harmful solid compound. Frequently, the deoxidizing agent also functions to convert the nitrogen, which may have seeped into the shield, into a solid compound. In its broader aspects, this invention contemplates a method of operation which involves the supply of a strongly deoxidizing material to an arc operated with or without added oxygen.

While certain specific aspects of this invention have been shown and described, many modifications thereof are possible. This invention therefore is not to be restricted except insofar as is necessitated by the spirit thereof.

I claim as my invention:

1. The method of joining material of medium-carbon steel having an appreciable content of manganese by arc welding said material with a consumable electrode, which comprises the steps of impressing a potential to produce and maintain an arc sufficient to melt said electrode between said electrode and said material, striking an arc between said electrode and said material while said potential is impressed therebetween, and maintaining said arc sheathed in an atmosphere including an inert gas and an amount of the order of 5% by volume of oxygen, the said method being characterized by the fact that the spacing between said electrode and said material and the magnitude of the arc current are maintained such while said arc is burning that said arc burns in a non-turbulent atmosphere and further characterized by the step of adding to said arc while it is burning, a strongly deoxidizing agent which forms solid oxides, as distinct from gaseous oxides, with oxygen to maintain said oxygen just sufficient to stabilize the arc without oxidizing the weld, said deoxidizing agent being said manganese in said steel.

2. The method of joining material of the type including a substantial proportion of a deoxidizing component which forms solid oxides as distinct from gaseous oxides with oxygen by arc welding said material with a consumable electrode, which comprises the steps of impressing a potential to produce and maintain an arc sufficient to melt said electrode between said electrode and said material, striking an arc between said electrode and said material while said potential is impressed therebetween, maintaining said arc sheathed in an atmosphere of commercially pure inert gas, and adding sufficient oxygen to the atmosphere to stabilize the arc, the said method being characterized by the fact that the spacing between said electrode and said material and the magnitude of the arc current are maintained such that the arc burns in a non-turbulent atmosphere so that substantially the only gas in addition to the inert gas present in said shield is said oxygen and by the further fact that said deoxidizing component reacts with said oxygen to maintain the quantity of said oxygen just sufficient to stabilize the arc without oxidizing the weld.

3. The method of joining material of steel by arc welding said material with a consumable electrode of steel having a thin coating of an arc stabilizing dissociable oxide on its surface, which comprises the steps of impresssing a potential to produce and maintain an arc sufficient to melt said electrode between said electrode and said material, striking an arc between said electrode and said material while said potential is impressed therebetween and maintaining said arc sheathed in an atmosphere of commercially pure inert gas, said oxide stabilizing said arc, the said method being characterized by the fact that the spacing between said electrode and said material and the magnitude of the arc current are maintained such that the arc burns in a non-turbulent atmosphere and by the further fact that a deoxidizing agent is added in sufficient quantity to permit the arc to be stabilized without oxidation of the weld.

4. The method of joining material of steel by arc welding said material with a consumable electrode of steel having a thin coating of ferroso-ferric oxide on its suface, which comprises the steps of impressing a potential to produce and maintain an arc sufficient to melt said electrode between said electrode and said material, striking an arc between said electrode and said material while said potential is impresed therebetween and maintaining said arc sheathed in an atmosphere of commercially pure inert gas, said oxide stabilizing said arc, the said method being characterized by the fact that the spacing between said electrode and said material and the magnitude of the arc current are maintained such that the arc burns in a non-turbulent atmosphere and by the further fact that a deoxidizing agent is added in sufficient quantity to permit the arc to be stabilized without oxidation of the weld.

5. The method of joining material by arc welding said material with a consumable electrode, which comprises the steps of impressing a potential to produce and maintain an arc sufficient to melt said electrode between said electrode and said material, striking an arc between said electrode and said material while said potential is impressed therebetween, and maintaining said arc sheathed in an atmosphere including an inert gas and sufficient oxygen to stabilize the arc, the spacing between said electrode and said material and the magnitude of the arc current being maintained such while said arc is burning, that said arc burns in a non-turbulent atmosphere, the said method being characterized by the step of adding to said arc while it is burning a strongly deoxidizing agent which forms solid oxides, as distinct from gaseous oxides, to react with said added oxygen and suppress oxidation of the weld.

6. The method of joining material by arc welding said material with a consumable electrode, which comprises the steps of impressing a potential to produce and maintain an arc sufficient to melt said electrode between said electrode and said material, striking an arc between said electrode and said material while said potential is impressed therebetween, maintaining said arc sheathed in an atmosphere of commercially pure inert gas, and adding sufficient oxygen to the atmosphere to stabilize the arc, the spacing between said electrode and said material and the magnitude of the arc current being maintained such that the arc burns in a non-turbulent atmosphere so that substantially the only gas in addition to the inert gas present in said shield is said oxygen, the said method being characterized by the fact that a deoxidizing agent is added to said arc to react with said added oxygen to suppress oxidizing of the weld.

7. The method of joining material of low-carbon steel by arc welding said material with a consumable electrode of low-carbon steel, which comprises the steps of impressing a potential to produce and maintain an arc sufficient to melt said electrode between said electrode and said material, said electrode being maintained electrically negative relative to said material, striking an arc between said electrode and said material while said potential is impressed therebetween, and maintaining said arc sheathed in an atmosphere including an inert gas and at least about 3% by volume of oxygen, the spacing between said electrode and said material and the magnitude of the arc current being maintained such while said arc is burning that said arc burns in a non-turbulent atmosphere, the said method being characterized by the step of adding to said arc while it is burning, a strongly deoxidizing agent which forms solid oxides, as distinct from gaseous oxides, to react with said oxygen to suppress the oxidizing of the weld.

8. The method of claim 5 wherein the deoxidizing agent is in the form of a powder and the electrode is passed through said powder so that said agent is attached to the surface of the electrode.

9. The method of joining material by arc welding said material with a consumable electrode, the said method comprising the steps of impressing a potential between said electrode and said material to produce and maintain an arc sufficient to melt said electrode, striking an arc between said electrode and said material while said potential is impressed therebetween, and maintaining said arc ensheathed in an atmosphere including an inert gas and oxygen in sufficient quantity to stabilize the arc, the spacing between said electrode and said material and the magnitude of the arc current being maintained such while said arc is burning that said arc burns in a non-turbulent atmosphere, which atmosphere prevents air and the nitrogen which said air includes from penetrating into the arc, the said method being characterized by the provision in the region of the weld of a deoxidizing agent to convert the oxygen in said atmosphere into a compound not harmful to the weld.

References Cited by the Examiner
UNITED STATES PATENTS

| | | | |
|---|---|---|---|
| 1,966,260 | 7/34 | Munson | 219—145 |
| 2,504,867 | 4/50 | Muller | 219—74 |
| 3,143,631 | 8/64 | Sohn et al. | 219—74 |

FOREIGN PATENTS

| | | |
|---|---|---|
| 495,299 | 11/38 | Great Britain. |

References Cited by the Applicant
UNITED STATES PATENTS

| | | |
|---|---|---|
| 1,678,148 | 7/28 | Kotchi. |
| 2,069,906 | 2/37 | Vaders. |
| 2,504,868 | 4/50 | Muller. |

OTHER REFERENCES

Smith's College Chemistry, 6th ed., by William F. Ehret, by Appleton Century Publishers, Incorporated, Chapter (XXI), pp. 234–235.

Oxidation of the Arc Crater, in Journal of American Welding Society of December 1926, pp. 11–14.

Stability of the Welding Arc, in Journal of AIEE of February 1928, pp. 109–112.

Crater Formation in Arc Welding, in Welding Research Supplement of October 1938, pp. 61–67.

Arc Welding in Controlled Atmospheres, in Welding Research Supplement of March 1940, pp. 110-S to 116-S.

Physics of the Arc and the Transfer of Metal in Arc Welding, in Welding Research Supplement of January 1943, pp. 2–S to 42–S.

RICHARD M. WOOD, *Primary Examiner.*